Oct. 10, 1950
M. J. CORWIN
2,525,018
VEGETABLE HARVESTER
Filed Aug. 10, 1946
3 Sheets-Sheet 2
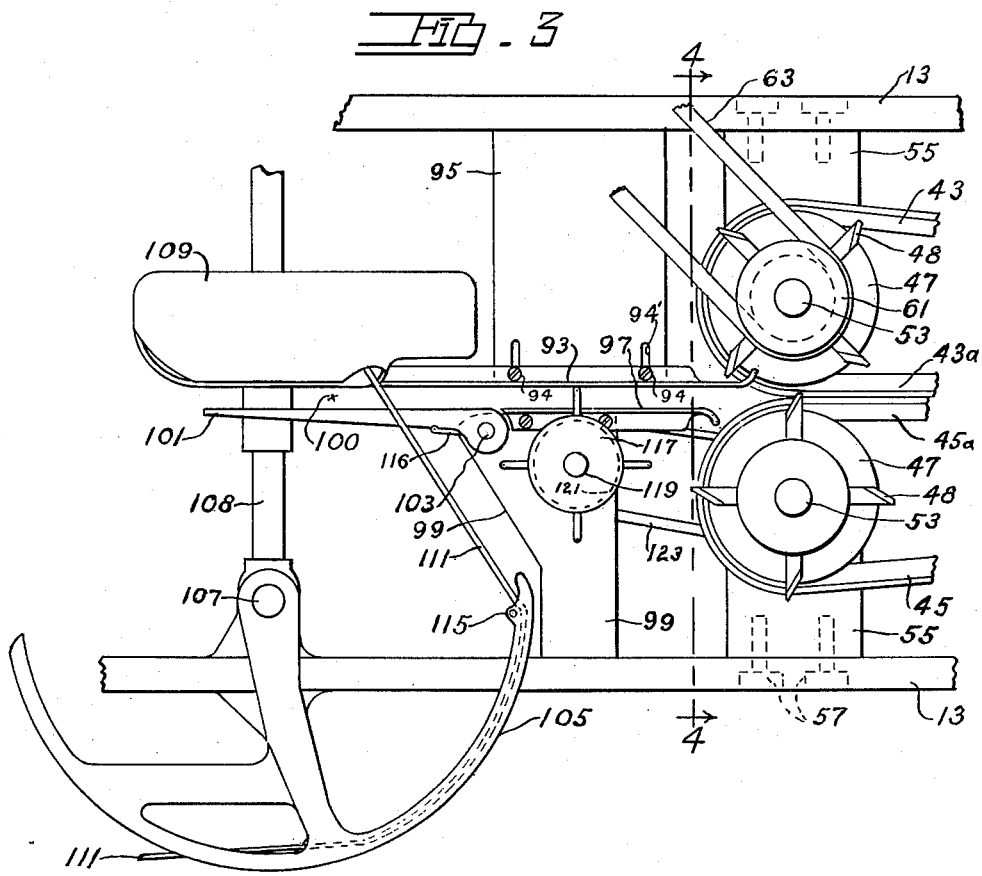
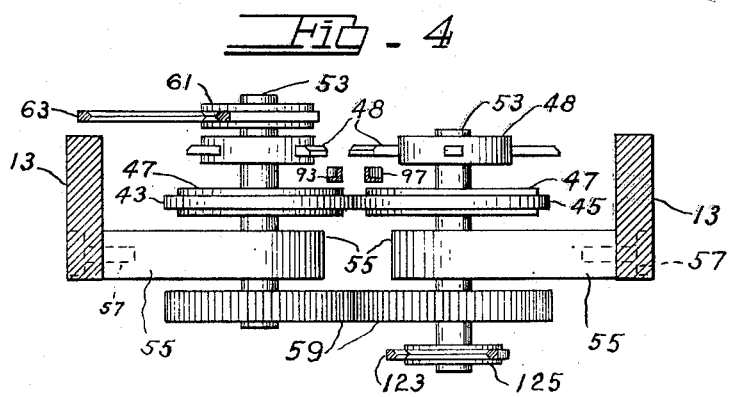
INVENTOR
Melvin J. Corwin
BY
ATTORNEY Oct. 10, 1950     M. J. CORWIN     2,525,018
VEGETABLE HARVESTER
Filed Aug. 10, 1946     3 Sheets-Sheet 3
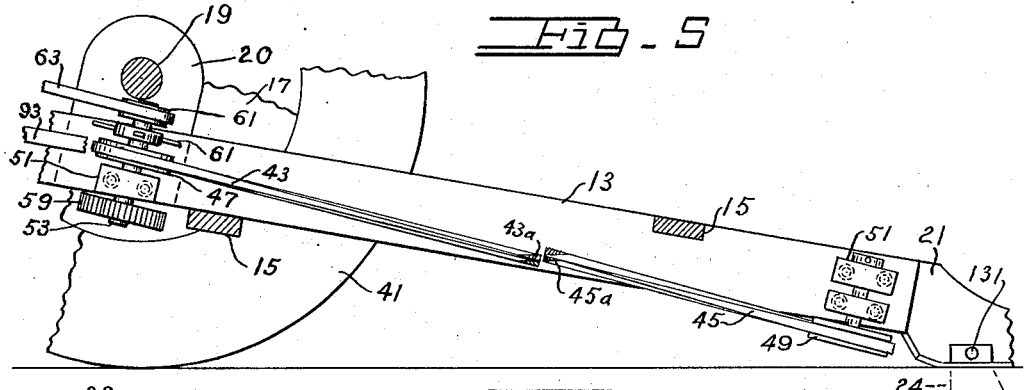
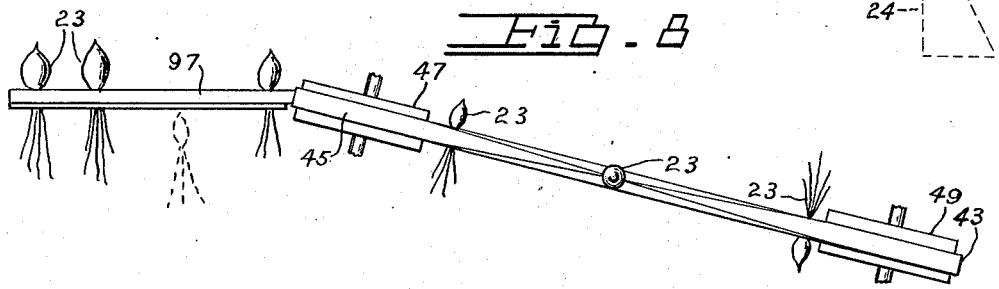
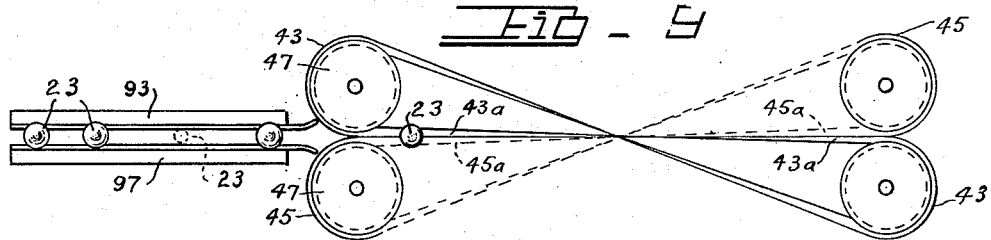
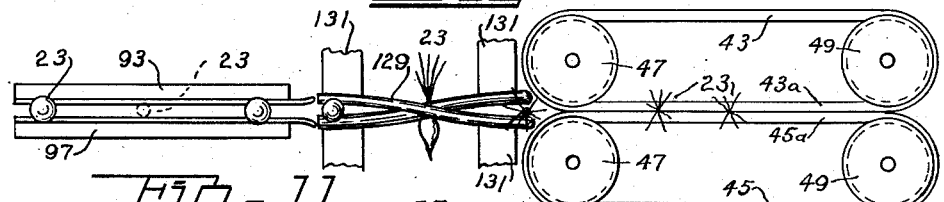
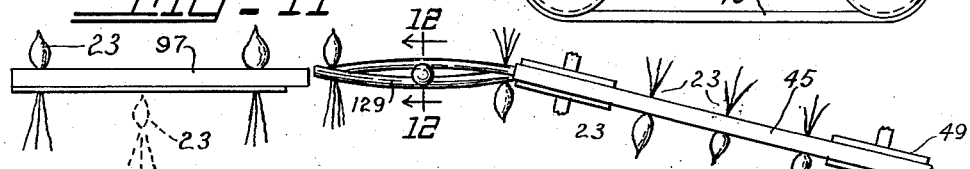
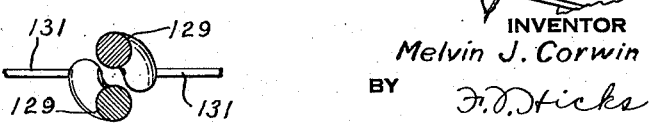
INVENTOR
Melvin J. Corwin
BY F. T. Hicks
ATTORNEY Patented Oct. 10, 1950

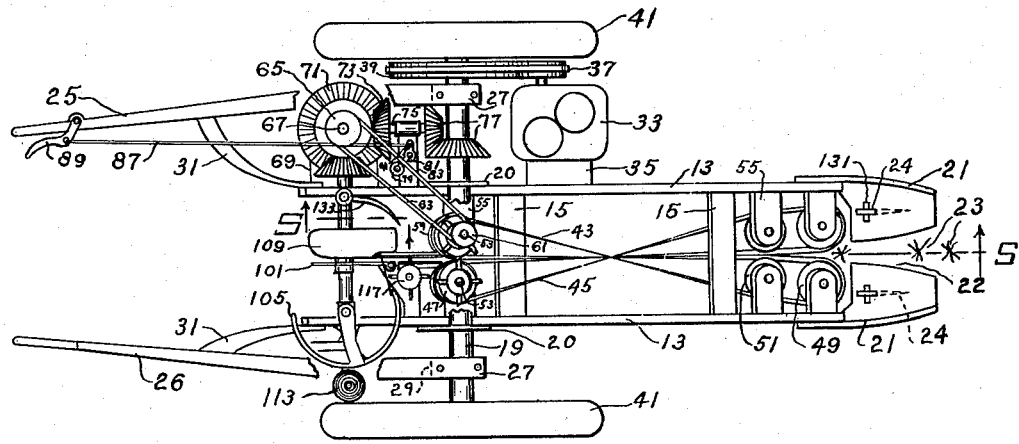

2,525,018

UNITED STATES PATENT OFFICE 2,525,018

VEGETABLE HARVESTER

Melvin J. Corwin, near Plymouth, Mich.

Application August 10, 1946, Serial No. 689,777

7 Claims. (Cl. 55—66)

The invention pertains to vegetable harvesters and more particularly to apparatus for pulling and handling root vegetables and which may also sort, bunch and tie the pulled vegetables.

It is an object of my invention to provide vegetable harvesters which are reliable in operation, and which are simple and economical to manufacture, operate and maintain.

It is also an object of my invention to provide a simple and reliable vegetable harvester which will perform the operations of pulling, sorting, bunching and tying vegetables.

It is a further object of my invention to provide improved means for pulling, handling and/or sorting root vegetables.

Another object of my invention is to provide improved means for pulling vegetables from the ground, rotating such vegetables while carrying and delivering them to a point of delivery in an inverted position for passage through a sorter which receives and sorts the vegetables in inverted position to pass only those of a desired size while dropping and discarding the smaller vegetables.

A further object of my invention is to provide an improved member or belt for handling, pulling or moving objects or materials.

Also an object of my invention is to provide a vegetable harvester which will be simple of structure, and the operation of which will be free of excessive noise and vibration.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of the invention, wherein like reference characters are applied to like parts, and in which:

Fig. 1 is a plan view of a vegetable harvester made in accordance with my invention;

Fig. 2 is a side elevational view thereof;

Fig. 3 is an enlarged fragmentary view of the rear portion of the plan view Fig. 1, for more clearly showing the bunching, packing and tying apparatus;

Fig. 4 is a cross sectional view taken on line 4—4 of Fig. 3;

Fig. 5 is a longitudinal sectional view taken on line 5—5 in Fig. 1; and enlarged;

Fig. 6 is a side elevational view of a fragment of an improved vegetable or object pulling or handling element as provided in the vegetable harvester;

Fig. 7 is a cross-sectional view thereof on line 7—7 of Fig. 6;

Figs. 8 and 9 are side and plan views, respectively, partially diagrammatic, for showing the operation of the belts in pulling vegetables and delivering same inverted into the sorter;

Fig. 10 is a plan view, partly diagrammatic, illustrating a different embodiment of the invention for handling and delivering the vegetables in inverted positions into the sorter;

Fig. 11 is a side view of the same embodiment as Fig. 10; and Fig. 12 is a cross-section.

Referring more particularly to Figs. 1 and 2 of the drawings, I have illustratively disclosed an embodiment of a vegetable harvester made in accordance with my invention and which comprises a frame or support structure fabricated from suitable heavy side members 13 joined rigidly in spaced parallel relation by a plurality of cross-pieces 15. The structural elements 13 and 15 may be of any suitable corrosion resistant steel fabricated by riveting or welding in accordance with usual practice in machine design, the cross-piece near the front end being between the upper edges of the side members 13 and the cross-pieces near the rear end being near the lower edges of the side members to provide free space for moving vegetables therethrough. In order that said frame structure may be supported for convenient movement over the ground along a row of vegetables to be harvested, a pair of ground wheels 17 are provided on the ends of an interconnecting axle 19 passing under the frame, which may be secured thereto by brackets 20.

Secured to the outside of the front end of each frame side member 13, as by welding or riveting, and extending thereunder and forwardly is a slide or runner 21 turned up along the front edge. These two runners or slides 21 extend before the front end of the frame toward the center forming a central slot 22 into which is received a row of vegetables 23 to be harvested. A cutter or coulter 24 may project down from each runner 21 for stirring and loosening the soil adjacent the vegetables.

A pair of control handles 25 and 26 are provided attached to axle brackets 27 which are connected to the axle 19 by bushing bearings 29 outside of the frame and adjacent to the wheels, in order to most easily control steering the harvester to straddle the row of vegetables. Handle brackets 31 are secured between the handles and the rear ends of the frame side members 13 so that the operator may, by pressing down upon the handles, lift or elevate the front end of the harvester to pass obstructions on the ground. The machine may be a light weight structure which may be pushed along by the operator through the handles 25 and 26, although it may be actually built upon and carried by some of the well known two-wheeled garden tractors (not shown), as will be readily understood. If preferred, motive power may be provided by a small internal combustion engine 33 mounted upon a bracket 35 extending from the outer side of one of the frame side members 13. For power transmission a belt 37 may pass over a belt wheel 39 on the axle shaft 19 as the two ground wheels are operatively connected to the opposite ends of the same axle shaft 19 through individual overrunning ratchets 36 in an arrangement common in two-wheeled agricultural utensils. If desired, an idler pulley (not shown) may be conveniently pressed against the belt to control starting and stopping in a manner common on motorcycles of an early model, and pneumatic tires 41 are preferably provided upon the wheels.

In accordance with my invention, vegetables 23 entering the central slot 22 are pulled out of the ground by a pair of endless belts 43 and 45 arranged to run over a rear pair of belt pulleys 47 and a front pair of pulleys 49 so that one straight stretch 43a of belt 43 runs along adjacent to or side-by-side to a straight stretch 45a of belt 45. These belt pulleys and belts may be seen in Fig. 1 and one belt may be seen under the frame at the front end in Fig. 2. The two front pulleys 49 are spaced apart suitably so that the vegetables 23 may enter freely and, to bring the belts closer together for firmly gripping the vegetable tops, front idler belt pulleys 51 are provided mounted slightly behind the front pulleys 49 and closer to the center line of the machine so that the two belts 43 and 45 will firmly grip the vegetable tops between the back surfaces of these belts. As shown in Fig. 1, it will be seen that the belt 43 which passes around the front pulleys 49 and 51 on the right hand side of the machine passes around the diagonally disposed rear pulley 47 on the right hand side of the machine. And the belt 45 which passes around front pulleys 49 and 51 on the left hand side of the machine also passes around the diagonally disposed rear pulley 47 on the right hand side of the machine. This causes said straight stretches, characterized as 43a and 45a, to twist over and change sides so that a vegetable gripped between these portions of the belts at the front end of the machine will, as it is carried to the rear of the machine, be turned to a horizontal position in the midportions of the belts and will be inverted by the time it reaches the rear or delivery point between the belts, as may be seen in Fig. 5 and more clearly from the diagrams of Figs. 8 and 9. Each belt and the diagonally disposed pulleys over which it runs are regarded as a unit. As for the twisted and crossed belting arrangement here used, this is exactly as though, in the simple belt arrangement shown at the right hand end of Fig. 10 the two pulleys at either end (with belts on) were picked up and turned over each pulley going into the place of the other and being inverted.

Although conventional belts 43 and 45 might be utilized for pulling and transporting and inverting the vegetables, I have found that these operations can be accomplished much more effectively by special handling members which I provide, as shown in Figs. 6 and 7. I take a conventional V type belt 48 having the usual angular pulley engaging surfaces 50 and to and along on the back surface 52 I secure a layer or strip 54 of some soft yieldable material, such as sponge or soft rubber. This layer 54 may be cemented on, or it is preferably secured more durably and permanently as by vulcanizing on the back of the belt. This arrangement has much better gripping and pulling properties for gripping or pulling vegetables or other objects.

The shafts 53 which rotatively support the two rear belt pulleys 47 may be provided with packer wheels 48 having radially projecting fingers which also aid the belts in discharging the vegetables. The shafts 53 are journalled in bearing brackets 55 secured at the outer ends to the side members 13, as by Allen screws 57, represented by dotted lines in Figs. 3 and 4, and the inner ends of the brackets are provided with suitable bearings for the shafts and are suitably spaced apart at the center to pass the vegetables therebetween. Intermeshing spur gears 59 are secured on the lower portions of these shafts 53 for driving the two belts together at the same speed, when power is applied through a drive pulley 61 secured on the upper end of one of these shafts, as may be seen in Figs. 1, 3, 4 and 5. From the drive pulley 61 a belt 63 extends to a belt pulley 65 on the upper end of a vertical shaft 67 journalled in a bearing bracket 69 and carrying a bevel gear 71 meshing with a bevel gear 73 on a horizontal shaft 75, which in turn is driven from the main axle shaft 19 through bevel gears 77. An idler pulley 79 is preferably provided running against the drive belt 63 and mounted on one end of an arm 81 the other end of which is pivotally mounted in a bracket 83 and controlled through a bellcrank connected to a rod 87 extending to a control lever 89 on the rear end of the handle 25. By gripping this handle 89 the idler 79 can be moved to release position to slack the belt and stop the vegetable handling belts. When the handle is released a spring 91 pulls the idler pulley 79 against the drive belt which is tightened for driving.

Adjacent the discharge ends of the vegetable moving belts 43 and 45, a sorter is provided for receiving the vegetables from this delivery point. As may be seen in Figs. 3 and 4, this sorter comprises a sorter bar or rail 93, which may be formed of an elongated piece of heavy gauge sheet metal bent angularly to a generally L shape cross-section so that one face surface is presented for slidably passing or guiding the vegetables as these are pushed from the belts, and having a horizontal web for stiffness and which may be secured and mounted adjustably by screws 94 in slots 94' upon a bracket 95 from the side frame member 13, on that side. The end of the sorter rail 93 adjacent the belts is curled outwardly to facilitate the entrance of the vegetable tops. A second sorter rail 97 is mounted on a bracket 99 extending from the other side member 13 of the frame and spaced suitably from the first mentioned rail 93 so that vegetables which are larger than a desired size cannot drop through but smaller vegetables fall through and are so discarded. The larger vegetables slide along being pushed by the vegetables coming from the belts, and these selected vegetables collect and form a bunch in the open area 100 at the rear of the second sorter bar 97 which is shorter than the other rail 93 and which has in alignment a trip lever 101 pivotally mounted upon a shaft 103 in the bracket 99, and providing with the first sorter rail a continuation of the space and open area 100 at the rear end for collecting the sorted vegetables in bunches. The trip lever 101 is part of a conventional knotter and tier mechanism such as well known and commonly used on grain binders for tying the bundles or sheaves of grain. Such a knotter comprises a curved needle 105 pivotally mounted upon a shaft 107, suitably supported in bearings in the side frame members and driven from link 108 passing cooperatively through the knotter mechanism 109 which holds one end of a cord 111 which passes through an aperture in the end of the needle and which comes into the needle from a ball of twine 113 which is carried in any suitable box conveniently disposed on the machine in accordance with the usual practice. To maintain the cord 111 in tension a friction device 115, known as a "tension," is provided in the point of the needle 105 where the twine leaves the needle, in accordance with the usual practice. As the bunch of vegetables is collected, the trip lever 101 is gradually pushed back against spring 116, until a bunch of a desired size has been collected against the twine 111 which is held taut by the tension in the point of the needle, and then the trip lever completes a driving connection, in the usual manner, and operates the needle to move into the knotter for completely wrapping the twine around the bundle of vegetables. The knotter ties the two ends of the twine together and cuts the twine from the completed bundle, in the well known manner, the needle and the trip lever then resuming the original positions, as represented in Fig. 3, ready for the next bundle to be collected.

A packer wheel 117 is secured on the upper end of a shaft 119 which passes down through the bracket 99 and has a belt pulley 121 secured on the lower end for driving by a belt 123 from a belt pulley 125 on the lower end of one of the shafts 53. This packer wheel 117 aids in moving the sorted vegetables to the rear and in packing them into a compact bunch for tying.

In operation, the vegetable harvester is moved over the ground along a row of vegetables so that the vegetables enter the central slot 22 formed between the two runners 21 on the front end of the frame. The two soil stirring coulters or cutters 24 on these runners serve to loosen the soil so that large vegetables may be easily pulled from the ground. But this is not necessary for smaller vegetables and these coulters may be removed or omitted from the vegetable harvester for such work, by removing bolts or pins 131.

As the vegetables enter the central slot, the tops are gripped between the back surfaces of the two belts 43 and 45 which, inclining upwardly to the rear, pull the vegetables from the ground. Also these belts being twisted turn the pulled vegetables through a half turn, as shown in the sectional view Fig. 5, and in the diagrammatic views Figs. 8 and 9. As a result the vegetables are in an inverted position when the rear or delivery point is reached, and in this inverted position they pass between the two adjustable spaced sorter rails 93 and 97. The smaller vegetables then are dropped through and discarded, as represented in dotted lines, in Figs. 8 and 9, and the vegetables which are of desired size or larger slide along on top of these sorter rails and are passed to the rear for collecting into bunches and tying. When the collected bunch of vegetables has attained a desired size, as determined by adjustment of the knotter trip lever 101 in a well known manner, the needle 105 and knotter 109 are set into operation to wrap the twine completely around the bunch, to tie the two ends of the twine together and to cut the twine from the bunch in the manner usual with such apparatus. A kicker 133 pushes the bunch out similarly to a binder discharging a sheaf of grain. The tops remaining on the inverted vegetables facilitate movement through the machine and the sorting, collecting and bunching operations which are to be performed by this vegetable harvester.

A simplified belting arrangement, as shown in Figs. 10 and 11, may be utilized for the two vegetable pulling belts 43 and 45 which may be run straight and without crossing or twisting by inserting between the belts and the sorter bars an inverter. This vegetable inverter, shown also in Fig. 12, comprises a pair of spaced rods 129 which are of a curved conformation so that they define a space between them which rotates through a half turn. These may be helical in formation but with a very long pitch, so that the vegetables rotate slowly while being pushed to the rear as represented in Figs. 10 and 11. The ends of the inverter rails adjacent the belts are preferably curled or rounded slightly to facilitate insertion of the vegetables and these rods may be supported by brackets 131 extending from the frame side members 13 to which rails may be secured, as by welding or in any suitable manner. The lengths of the belts 43 and 45 when run in this simple manner may be shortened, so that the overall length of the embodiment of the machine may be substantially the same.

It is apparent that within the scope of my invention modifications and different arrangements may be made other than herein disclosed, and the present disclosure is illustrative merely, the invention comprehending variations thereof.

What is claimed is:

1. In a vegetable harvester the combination of a support structure, ground wheels supporting said structure to be moved over the ground along a row of vegetables to be harvested, a pair of endless belts, pairs of belt pulleys rotatively mounted in suitable spaced positions on said structure, each of said belts passing over substantially diagonally opposed pulleys in each of said pairs of pulleys, each of said pairs of pulleys and its belt together constituting a unit, the runs of said belt in each unit crossing each other, and said units being disposed in crossed relationship with each other whereby a single twist is imparted to said belts for receiving and gripping vegetable tops between the adjacent surfaces thereof, means for moving the two belts together for pulling the vegetables from the ground and transporting the same to a point of delivery, said vegetables being rotated approximately one-half a turn from an upright to an inverted position by the twist in said belts.

2. In a vegetable harvester the combination of a support structure, ground wheels supporting said structure to be moved over the ground along a row of vegetables to be harvested, means on said structure for loosening the soil adjacent said vegetables, a pair of endless belts, pairs of belt pulleys rotatively mounted in suitable spaced positions on said structure, each of said belts passing over substantially diagonally opposed pulleys in each of said pairs of pulleys, each of said pairs of pulleys and its belt together constituting a unit, the runs of said belt in each unit crossing each other, and said units being disposed in crossed relationship with each other whereby a single twist is imparted to said belts for receiving and gripping vegetable tops between the adjacent surfaces thereof, means for moving the two belts together at the same velocities for pulling the vegetables from the ground and transporting the same to a point of delivery, said vegetables being rotated approximately one-half a turn from an upright to an inverted position by the twist in said belts.

3. In a vegetable harvester the combination of a support structure, ground wheels supporting said structure to be moved over the ground along a row of vegetables to be harvested, a pair of endless belts, pairs of belt pulleys rotatively mounted in suitable spaced positions on said structure, each of said belts passing over substantially diagonally opposed pulleys in each of said pairs of pulleys, each of said pairs of pulleys and its belt together constituting a unit, the runs of said belt in each unit crossing each other, and said units being disposed in crossed relationship with each other whereby a single twist is imparted to said belts approximately in the mid portions thereof for receiving and gripping vegetable tops between the adjacent surfaces thereof, means for moving the two belts together for pulling the vegetables from the ground and transporting the same to a point of delivery, said vegetables being rotated approximately one-half a turn from an upright to an inverted position by the twist in said belts.

4. In a vegetable harvester the combination of a support structure, ground wheels supporting said structure to be moved over the ground along a row of vegetables to be harvested, a pair of endless belts, pairs of belt pulleys rotatively mounted in suitable spaced positions on said structure, said belts and pulleys being of the V-type, each of said belts passing over substantially diagonally opposed pulleys in each of said pairs of pulleys, each of said pairs of pulleys and its belt together constituting a unit, the runs of said belt in each unit crossing each other, and said units being disposed in crossed relationship with each other whereby a single twist is imparted to said belts for receiving and gripping vegetable tops between the adjacent wide back surfaces of said belts, means for moving the two belts together for pulling the vegetables from the ground and transporting the same to a point of delivery, said vegetables being rotated approximately one-half a turn from an upright to an inverted position by the twist in said belts.

5. In a vegetable harvester the combination of a support structure, ground wheels supporting said structure to be moved over the ground along a row of vegetables to be harvested, a pair of endless belts, pairs of belt pulleys rotatively mounted in suitable spaced positions on said structure, each of said belts passing over substantially diagonally opposed pulleys in each of said pairs of pulleys, each of said pairs of pulleys and its belt together constituting a unit, the runs of said belt in each unit crossing each other, and said units being disposed in crossed relationship with each other whereby a single twist is imparted to said belts for receiving and gripping vegetable tops between the adjacent surfaces thereof, means for moving the two belts together for pulling the vegetables from the ground and transporting the same to a point of delivery, said vegetables being rotated approximately one-half a turn from an upright to an inverted position by the twist in said belts and spaced adjustable bars for receiving the inverted vegetables discharged from said belts.

6. In a vegetable harvester the combination of a support structure, ground wheels supporting said structure to be moved over the ground along a row of vegetables to be harvested, a pair of endless belts, pairs of belt pulleys rotatively mounted in suitable spaced positions on said structure, each of said belts passing over substantially diagonally opposed pulleys in each of said pairs of pulleys, each of said pairs of pulleys and its belt together constituting a unit, the runs of said belt in each unit crossing each other, and said units being disposed in crossed relationship with each other whereby a single twist is imparted to said belts for receiving and gripping vegetable tops between the adjacent surfaces thereof, means for moving the two belts together for pulling the vegetables from the ground and transporting the same to a point of delivery, said vegetables being rotated approximately one-half a turn from an upright to an inverted position by the twist in said belts, and spaced horizontally disposed elongated bars adjustably arranged adjacent the discharge ends of said belts between which the vegetables are pushed in inverted positions.

7. In a vegetable harvester the combination of a support structure, ground wheels supporting said structure to be moved over the ground along a row of vegetables to be harvested, a pair of endless belts, pairs of belt pulleys rotatively mounted in suitable spaced positions adjacent the front and rear ends of said structure, said respective pairs of pulleys being in the same plane, each of said belts passing over substantially diagonally opposed pulleys in each of said pairs of pulleys, each of said pairs of pulleys and its belt together constituting a unit, the runs of said belt in each unit crossing each other, and said units being disposed in crossed relationship with each other whereby a single twist is imparted to said belts for receiving and gripping vegetable tops between the adjacent surfaces thereof, means for moving the two belts together for pulling the vegetables from the ground and transporting the same to a point of delivery, said vegetables being rotated approximately one-half a turn from an upright to an inverted position by the twist in said belts.

MELVIN J. CORWIN.

REFERENCES CITED

The following references are of record in the file of this patent:

UNITED STATES PATENTS

| Number | Name | Date |
| --- | --- | --- |
| 844,476 | Seierup | Feb. 19, 1907 |
| 1,190,598 | Seierup | July 11, 1916 |
| 1,459,060 | Kreipe | June 19, 1923 |
| 1,568,482 | Thompson | Jan. 5, 1926 |
| 1,587,243 | Seifert | June 1, 1926 |
| 1,998,816 | Meyer | Apr. 23, 1935 |
| 2,163,347 | Nassimbene | June 20, 1939 |
| 2,376,723 | Reavill | May 22, 1945 |